United States Patent [19]

Poole et al.

[11] Patent Number: 4,917,852
[45] Date of Patent: Apr. 17, 1990

[54] METHOD AND APPARATUS FOR RAPID SOLIDIFICATION

[75] Inventors: John W. Poole, Bow, N.H.; Merton C. Flemings, Cambridge, Mass.; Thomas A. Gaspar, Columbus, Ohio; Matthew A. Simpson, Manchester, N.H.

[73] Assignee: Norton Company, Worcester, Mass.

[21] Appl. No.: 188,584

[22] Filed: Apr. 29, 1988

[51] Int. Cl.$^4$ .............................................. B29B 9/10
[52] U.S. Cl. .................................. 264/500; 209/135; 209/639; 219/121.37; 219/121.38; 219/121.51; 264/8; 264/10; 264/12; 264/309; 425/7
[58] Field of Search ................. 264/8, 10, 12, 80, 500, 264/309; 425/7, 8, 436 R, 436 RM, 449; 219/121.37, 121.38, 121.47, 121.51, 121.52, 121.59; 209/134, 135, 638, 639

[56] References Cited

U.S. PATENT DOCUMENTS

| | | | |
|---|---|---|---|
| 197,897 | 12/1877 | Rice | 209/135 |
| 244,114 | 7/1881 | De Soulages | 209/135 |
| 1,042,836 | 10/1912 | Stromborg | 209/135 |
| 2,828,011 | 3/1958 | Whitby | 209/135 |
| 4,011,290 | 3/1977 | Blomqvist et al. | 264/12 |
| 4,104,505 | 8/1978 | Rayment et al. | 219/121.59 |
| 4,259,270 | 3/1981 | Winter et al. | 264/8 |
| 4,326,842 | 4/1982 | Adachi et al. | 219/121.37 |
| 4,375,440 | 3/1983 | Thompson | 264/8 |
| 4,386,896 | 6/1983 | Ray | 425/7 |
| 4,565,792 | 1/1986 | Knapp | 501/104 |
| 4,570,048 | 2/1986 | Poole | 219/121 |
| 4,656,330 | 4/1987 | Poole | 219/121 |

FOREIGN PATENT DOCUMENTS

| | | | |
|---|---|---|---|
| 094030 | 4/1983 | European Pat. Off. | |
| 2657754 | 6/1978 | Fed. Rep. of Germany | 209/135 |
| 1176976 | 12/1985 | U.S.S.R. | 209/139 R |
| 1251967 | 8/1986 | U.S.S.R. | 209/135 |

OTHER PUBLICATIONS

Rapid Solidification of Ceramics, pub. by the Metals and Ceramics Information Center, Batelle Columbus Laboratories, Columbus, Ohio, 1984.
Paper—"Production and Processing of Rapidly Quenched Aluminum Powders", Author: R. E. Maringer, 25th Natl. SAMPE Symposium and Exhibition, May 6-8, 1980.

Primary Examiner—Jan H. Silbaugh
Assistant Examiner—Mary Lynn Fertig
Attorney, Agent, or Firm—Arthur A. Loiselle, Jr.

[57] ABSTRACT

A novel process for rapid solidification of ceramic melts combines certain features of cooling by atomization and by contact with chilling surfaces. The material to be solidified is divided into fine liquid droplets that are propelled by a rapid flow of gas toward a rapidly moving chill surface, striking the surface with sufficient velocity to flatten each drop into a flat flake like shape. Apparatus for the process is also disclosed. The process is particularly applicable to making very fine grained, or even amorphous, ceramic materials that can be powdered and then sintered into strong, tough ceramic structures.

2 Claims, 4 Drawing Sheets

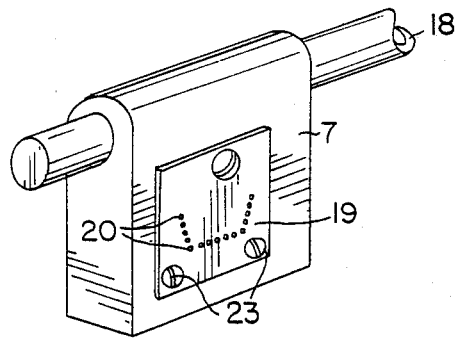
FIG. 3
FIG. 4A 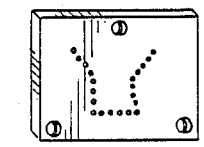  FIG. 4B 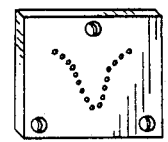  FIG. 4C 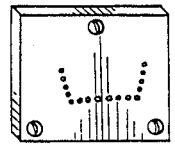  FIG. 4D 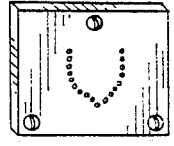
FIG. 2
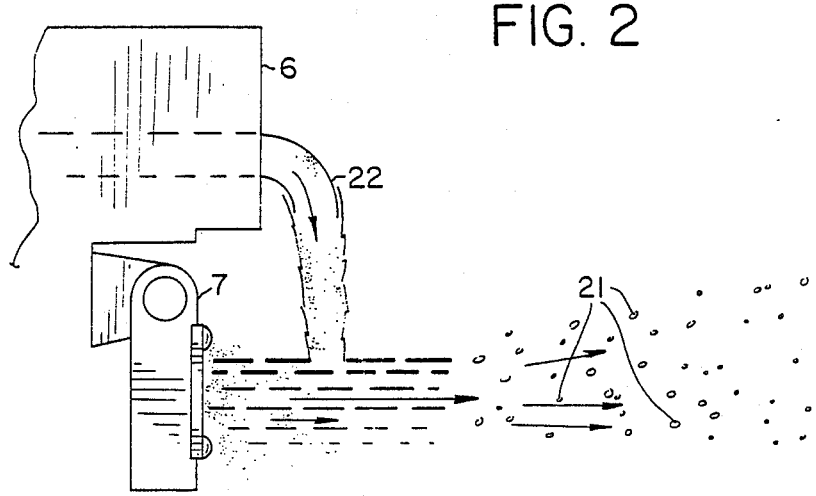

METHOD AND APPARATUS FOR RAPID SOLIDIFICATION

TECHNICAL FIELD

This invention relates to rapid cooling of melts to produce solid materials. It is more particularly related to the cooling of melted ceramic compositions to produce solid products that are amorphous and/or have very fine microstructure.

TECHNICAL BACKGROUND

Numerous compositions that comprise at least two chemically distinct materials form stable liquid solutions when melted but separate spontaneously into two or more phases when solidified. Some compositions that are essentially a single chemical substance, although they are believed on theoretical grounds to have only one solid phase at equilibrium at any specified temperature and pressure, can form distinct phases other than or in addition to the equilibrium one when cooled quickly from melts. An important example of the latter type of material is alumina, which is known to be capable of existing in metastable "transition" phases such as gamma, delta, and theta when cooled rapidly from melts, even though its only equilibrium crystal form at normal temperature and pressure is believed to be alpha. Compositions of both these types will be denoted herein as "multi-phase solidifying compositions" or "MPSC's".

When melted MPSC's of the type with at least two distinct phases at equilibrium are cooled slowly, and when as is usual one of the stable solid phases has a higher equilibrium solidification temperature than the other(s), a very inhomogeneous solid structure usually results, because the slow cooling rate allows the formation of large domains of the first phase to solidify. These large domains are later embedded in a matrix of one or more additional phases after complete solidification.

When cooling of either type of MPSC is rapid enough, all the solid phases capable of coexistence at equilibrium will usually form quickly, so that the particles of each separate phase can be very small. In some cases, the equilibrium phase(s) may not form at all, leading to a metastable solid that is amorphous or that has such a fine microstructure as to appear for all practical purposes as an otherwise unknown "pseudo-phase", possibly comprising very small domains of all of the solid phases that would be formed from the same composition at equilibrium. Such metastable solids often have practically useful properties and are not readily or economically achievable by other techniques than rapid cooling. For example, U.S. Pat. No. 4,565,792 of Jan. 21, 1986 to Knapp teaches that rapidly solidified cofusions of zirconia and stabilizing oxides yield powders from which superior sintered ceramic bodies can be produced. The methods of cooling noted in this patent involve cooling in air or in thin layers on or between metal plates or spheres. European Patent Application No. 0 094 030 published Nov. 16, 1983 teaches the use of cold liquid jets to effect rapid cooling of various liquid compositions that yield ceramics upon cooling.

Additional methods of cooling known in the prior art are reviewed in Rapid Solidification of Ceramics, published by the Metals and Ceramics Information Center Battelle Columbus Laboratories, Columbus, Ohio in 1984. The part of this reference believed most relevant to this invention is that between pages 6–20 inclusive, and the most particularly relevant parts within this are FIGS. 2, 7, 8, 11, and 18 and the descriptive text associated with each of these figures. FIG. 2 shows a process in which solid powder is introduced into a plasmatron, in which the powder is presumably melted. The molten liquid droplets are then propelled onto the surface of a cooling metal disc by a flow of argon gas through the plasmatron. FIG. 7 shows a continuous stream of molten material flowing on to the surface of a rotating cylinder on which it is cooled and from which it may be detached as a continuous quenched film. FIG. 8 shows a similar stream of liquid flowing onto the inner surface of a rotating quench drum. FIG. 11 shows a process in which liquid from an "image floating zone" is propelled by blasts, presumably discontinuous, of high pressure gas, onto a water cooled substrate. FIG. 18 illustrates a process in which solutions of salts are blown in the form of a mist into a heated space in which the solvents evaporate and the salts decompose to yield fine powders. It is stated that this is not a rapid solidification process, but that it sometimes produces powders similar to those made by rapid solidification.

A particularly relevant comment from this Battelle reference is on page 19: "Based upon published literature it can be concluded that only laboratory scale processes have been developed for rapid solidification of ceramic materials."

A paper titled "Production and Processing of Rapidly Quenched Aluminum Powders" by R. E. Maringer, published at pages 67–74 of the record of the 25th National SAMPE Symposium and Exhibition held May 6–8, 1980, describes in its section 2.2.2 a method of making aluminum flakes by causing molten droplets of aluminum alloy to impinge on a cooled drum. This reference does not show any rapid cooling of ceramic materials, however, and it gives no detail about the method of atomization used.

SUMMARY OF THE INVENTION

It has been found that exceptionally favorable rapid solidification for ceramic multi-phase solidifying compositions can be obtained by a process comprising (a) dividing the melted MPSC into fine liquid droplets; (b) conveying these fine droplets in a stream of high velocity fluid that imparts to the droplets sufficient momentum to cause them to impinge, while still at least partially liquid, against a moving solid chilling surface, having a sufficiently high thermal conductivity and maintained at a temperature sufficiently low to cause solidification of the MPSC, with sufficient velocity that the drops are converted into solidified discrete "flats" having a thickness, measured in a direction perpendicular to their area of contact with said chilling surface, that is less than one-half of the square root of their area of contact with said solid surface; and (c) separating these flats from said chilling surface.

Another embodiment of the invention comprises (a) dividing a melted ceramic MPSC into fine liquid droplets; (b) conveying these fine droplets in a stream of high velocity fluid that imparts to the droplets sufficient momentum to cause them to impinge, while still at least partially liquid, against a moving solid chilling surface maintained at a temperature sufficiently low to cause solidification of the MPSC, with a velocity that converts the drops, after their contact with the chilling surface, into small discrete bodies that spontaneously detach themselves from the chilling surface; and (c) collecting the small discrete bodies formed in part (b).

It has also been found that rapid solidification according to the first above described embodiment of this invention can advantageously be performed with the aid of a new type of apparatus, comprising (a) means for continuously generating a stream of fine fully melted ceramic MPSC liquid droplets; (b) a moving solid chilling surface maintained at a temperature sufficiently low to cause complete solidification of said MPSC; (c) means for conveying the MPSC liquid droplets in a stream of high velocity fluid that imparts to said droplets sufficient momentum to cause them to impact, while still at least partially liquid, onto said chilling surface so as to form thereon discrete solid "flats" having a thickness, measured in a direction perpendicular to their area of contact with said chilling surface, that is less than one-half of the square root of their area of contact with said solid surface; and (d) means for detaching these flats from said chilling surface.

A suitable novel apparatus for performing the process according to the alternative embodiment of this invention comprises (a) means for continuously generating a stream of fine fully melted ceramic MPSC liquid droplets; (b) a moving solid chilling surface maintained at a temperature sufficiently low to cause complete solidification of said MPSC; (c) means for conveying the MPSC liquid droplets in a stream of high velocity fluid that imparts to said droplets sufficient momentum to cause them to impact onto said chilling surface at an appropriate velocity so as to convert said droplets into small discrete bodies that spontaneously detach themselves from said chilling surface; and (d) means for collecting the discrete solid bodies formed in step (c).

The processes and apparatus according to this invention are both suitable for operation on a scale to produce commercial sinterable ceramic powders that sinter to give ceramic bodies with good physical properties.

BRIEF DESCRIPTION OF THE DRAWINGS

FIG. 2 is a side view of a portion of the apparatus of FIG. 1 during operation. FIG. 3 is a perspective view in more detail of the delivery device for propelling gas used in the apparatus shown in FIG. 1. FIGS. 4A, 4B, 4C and 4D show some of the preferred configurations for gas exit holes in the delivery device of FIG. 3.

DESCRIPTION OF THE PREFERRED EMBODIMENTS

Figure 1:
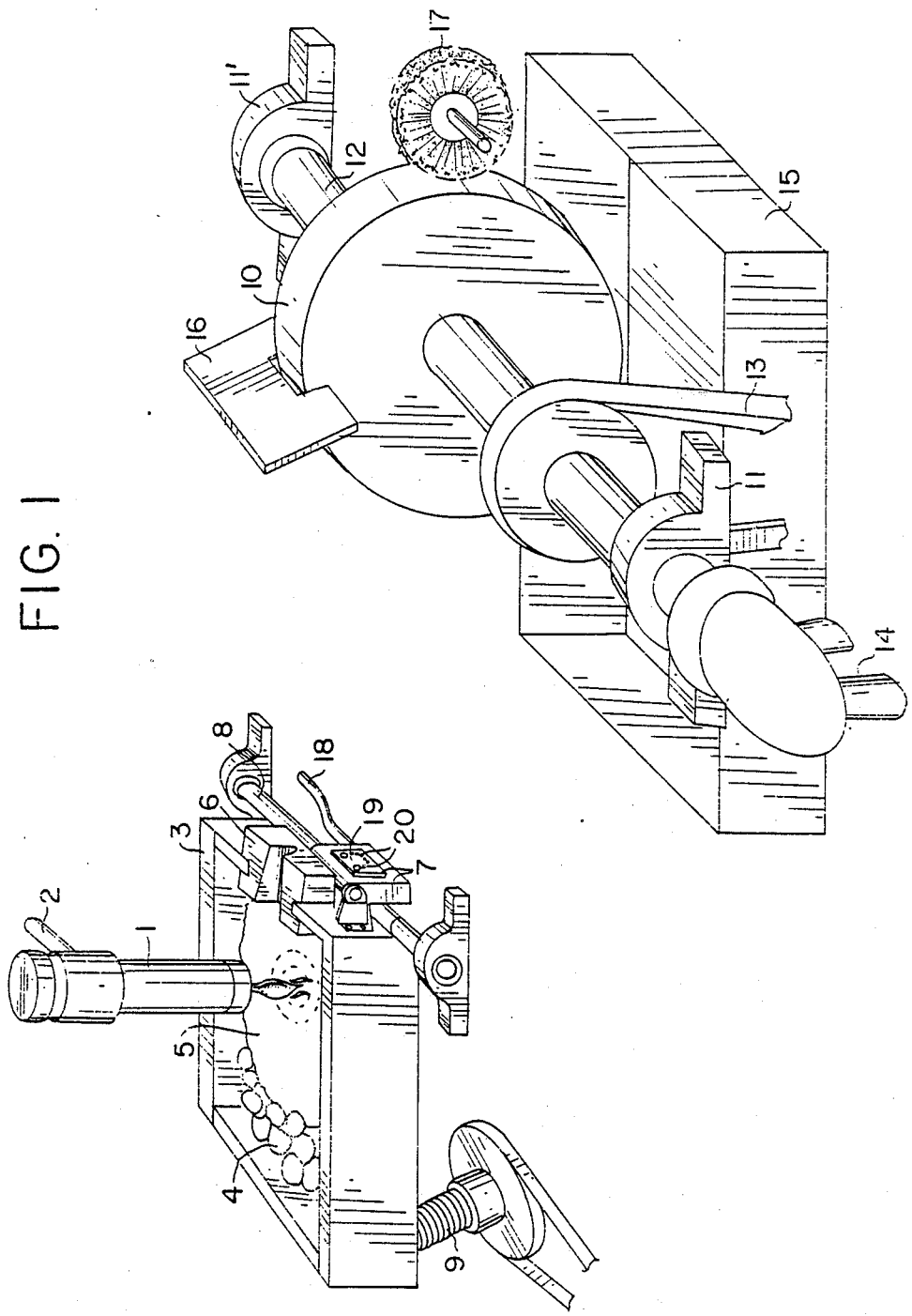
FIG. 1 is a perspective view of an apparatus according to this invention suitable for continuous or batchwise performance of a process according to this invention.

The preferred chilling surface for use in the embodiment of this invention that results in MPSC flats is a metal "surface of rotation", i.e., a surface that can be generated by moving a segment of any curve, called the "generating curve", around a straight line, called the "axis of rotation", while keeping constant the distance from any given point on the generating curve to the axis of rotation. The common right circular cylinder is the most common example of a surface of rotation and is adequate for use in this invention, but the most preferred chilling surface is a surface of rotation in which the center is depressed below the edges. The chilling surface is preferably sufficiently large in size to intercept the entire flow of liquid droplets directed toward it; an almost equally satisfactory alternative is to use two or more chilling surfaces arranged so that material which misses one contacts another.

The chilling surface used to make MPSC flats preferably has a high heat conductivity, at least 1.3 joules per second per square centimeter of area per centimeter of thickness per degree Celsius, such as may be achieved with a surface of aluminum, copper or other coinage metals or their alloys, and still higher heat conductivity is still more preferable. The chilling surface normally should itself be cooled during extended continuous operation of a process according to this invention by some conventional and convenient means such as a flow of cold liquid within the surface of rotation.

When using the process of this invention to make flats, the chilling surface should preferably be moved at a sufficiently high speed to assure that substantially all the liquid droplets impinging on it will touch the chilling surface itself rather than one of the flats formed temporarily on the surface by another liquid droplet. Care should be taken, however, that the chilling surface does not move so fast as to produce an airflow over the surface that will impede the desired contact between the MPSC droplets and the chilling surface. The exact value would depend on details of the flow of propelling fluid used, the other geometrical characteristics of the apparatus, and the chemical nature of the MPSC composition used in the process.

For the alternative embodiment of the invention used to produce spontaneously detaching, usually rounded, bodies of MPSC rather than flats, the same kind of basic chilling surface can be used, provided that the thermal conductivity is reduced by forming on the metal surface a moderately thick layer of oxide. Such a layer may be formed on the high copper alloy Ampcoloy 948, further described below, a preferred material for the chilling surface, by exposing the surface to the effluent from a plasma torch.

The liquid droplets are conveniently both formed and propelled by a stream of high velocity fluid, directed towards the chilling surface, into which a continuous stream of liquid MPSC is introduced, or drops of liquid MPSC are introduced at a substantially consistent rate. The speed of the gas stream should be sufficiently high to provide adequate breakup of the liquid stream into drops of the proper size, and in addition the speed and temperature of the gas stream should be jointly controlled so that the drops will still be at least partially liquid at the point of impingement against the chilling surface. In general, a gas stream velocity of at least 200 meters/sec is preferred, and full sonic velocity, about 330 meters/sec for air, is still more preferred.

Normally a gas is preferred as the propelling fluid, and in any case, the fluid should be chosen so as to avoid any undesirable chemical reaction with the liquid MPSC. Normally, air, nitrogen, or one of the noble gases such as argon will provide a satisfactory propelling gas. If necessary, the gas may be heated to prevent premature cooling of the MPSC droplets, but often gas at normal room temperature will be satisfactory.

Combined atomization and propulsion may conveniently be accomplished by (i) providing a propelling gas outlet comprising a reservoir having in part of its defining wall an exit zone at least 1.25 times wider than the stream of liquid MPSC to be atomized, (ii) supplying to this reservoir a sufficiently rapid flow of a propelling gas to maintain within the reservoir a sufficient pressure of propelling gas so as to maintain a continuous flow of propelling gas through said exit zone at an adequate propelling velocity of at least 200 meters per second as measured along the direction line providing the shortest distance between each part of said exit zone and said moving chilling surface; and (iii) introducing into the flow of propelling gas between the exit zone and the chilling surface a quantity of liquid MPSC that will be atomized to a plurality of said fine liquid MPSC droplets by the flow of propelling gas between said exit holes and said chilling surface.

The exit zone could be a narrow slot, straight or curved, but preferably it consists of a plurality of exit holes, each having a maximum dimension no more than nine-tenths of the distance between centers of the holes. The pattern of holes preferably should be at least five times as wide as the largest dimension of an individual hole in the group, and most preferably should be from ten to fifteen times wider than the largest dimension of an individual hole in the pattern.

Whether the exit zone has the form of a slot, a plurality of holes, or some other equivalent form, it preferably has a "local height" no more than one-fifth of its width. The term "local height" refers to height in a small segment of the zone, not to the overall zone. For example, if the zone were a flat horizontal slot, the local height would be the vertical dimension of the slot. If an otherwise similar slot with upcurved ends were used, the local height would be the same as before, not affected by the larger pattern of the slot. If the exit zone consisted of a plurality of equally sized circular holes arranged in a pattern with a horizontal extent, the local height of the zone would be the diameter of one of the holes, irrespective of whether all the hole centers were in a straight line or in some other pattern such as those illustrated in FIG. 4.

The simplest arrangement for the preferred type of atomizing and propelling apparatus is a pattern of exit holes in a horizontal straight line. A pattern of 15 holes, each 1.0 mm in diameter and spaced 0.5 mm from its nearest neighbor(s), has been found adequate in some cases. One difficulty with this arrangement, however, is that it produces a flow of propelling gas that tends to propel part of the liquid MPSC off toward the side of the main flow, so that it avoids contact with the chilling surface, unless the liquid MPSC is introduced quite close to the exit holes. For this reason, it is preferred to arrange the exit holes for the gas in a pattern, such as one of the patterns illustrated in FIGS. 4A, 4B, 4C and 4D, that has a closed side, an open side, and an interior region. The quantity of liquid MPSC to be atomized can then be introduced along a path through the open side of the pattern into its interior, with much less likelihood than with a straight line pattern of exit holes that any substantial portion of the liquid will be propelled along a path that allows it to avoid contact with the chilling surface.

If very high cooling rates are desired in the process, as they normally are, droplets no more than 0.75 mm in diameter should be formed by the atomization process, and still smaller droplets are often more preferable. Sometimes, on the other hand, high process throughput is more desirable than achieving the maximum cooling rates, and under such conditions considerably larger droplets that will form larger and thicker flakes than are achieved with the higher cooling rates are useful. In this mode of operation, it may also be advantageous to move the chilling surface more slowly than would be desirable when higher average cooling rates are desired.

When flats are the desired product from the process, the stream of high velocity gas preferably should be controlled by the positioning of one or more outlets for the gas, the size of the outlet(s), and the distance(s) between the outlet(s) and the chilling surface, so that all of the liquid droplets of the MPSC formed will impinge against the chilling surface within a fairly narrow zone thereof, in order to minimize the chances of overlap between the solid flats and/or of failure of a substantial fraction of the liquid droplets formed to contact the chilling surface.

Sometimes solidified flats of MPSC will fall spontaneously off, or even rebound from, the chilling surface, and sometimes satisfactory product will be achieved under such conditions of operation. Usually, however, it has been found preferable if the solidified flats adhere to the chilling surface sufficiently to move with it for at least a short distance from the point of initial contact. This allows a longer time of contact with the chilling surface and tends to produce more consistent results. In order to promote such temporary adhesion of the solidified MPSC flats to the chilling surface, it is often advantageous to texture the surface before use by contact with a rotating wire brush, lofty non woven abrasive, or similar tool to impart a satiny finish rather than an extremely smooth one. Some MPSC's, of course, have adequate adhesion to a very smooth chilling surface to achieve adequate dwell times and cooling rates for the properties desired in the product.

Any MPSC flats that do adhere temporarily to a rotated chilling surface should preferably be dislodged from the chilling surface during each rotation, so that a substantially clean and uniform surface is presented to the impinging flow of liquid MPSC droplets at all times during operation.

It should be understood that, because of the great difficulties of controlling all the variable conditions of the process when high melting MPSC's are used, it is quite common in operation of the process according to this invention for only a fraction of the liquid supplied to be converted to the desired flats, with the remainder solidifying in the propelling gas stream or otherwise not desirably processed. In most situations, the desired flats can be separated from the other types of solidified bodies formed in the process, and these undesired types of solidified bodies can be recycled into the stream of liquid used in the process, so that a high conversion rate of the input to the liquid stream can eventually be achieved.

A method of separating the desired flats from other small solid bodies produced during operation of the process is illustrated in FIG. 6. The dry mixed solid bodies are placed in hopper feeder 78, from which they are delivered at a controlled rate into vibrator feeder trough 76. A vibrator 77 connected to the trough 76 causes a slow migration of the mixed MPSC bodies down the trough until they fall off the end of the trough in front of the outlet of air plenum 710. Air from a fan 712 is forced through a fine nylon mesh pocket 711 to diffuse its flow pattern, and the pattern is further modified by passage through a "stack" of horizontally disposed thin flat plates space uniformly apart by about 2 mm. The smallest and thinnest flakes, containing the largest fraction of very rapidly cooled MPSC, because of their shape, are more effectively levitated by the air flowing out from the plenum 710, so that they are carried the farthest distance away and fall in container 71. The largest and most nearly equiaxed particles of MPSC, being least effectively levitated, will fall most rapidly and be collected in container 75. Intermediate fractions of particles are collected in containers 72, 73, and 74.

It has also been found that, with most MPSC compositions, solidified bodies containing the highest proportion of non-crystalline material are carried further in a horizontal air flow than similarly shaped bodies with a substantial fraction of crystalline inclusions. Thus, the apparatus of FIG. 6 can also be used to separate such bodies on the basis of higher and lower average cooling rates, which correspond to higher and lower proportions of amorphous and crystalline material within the bodies.

Figure 5:
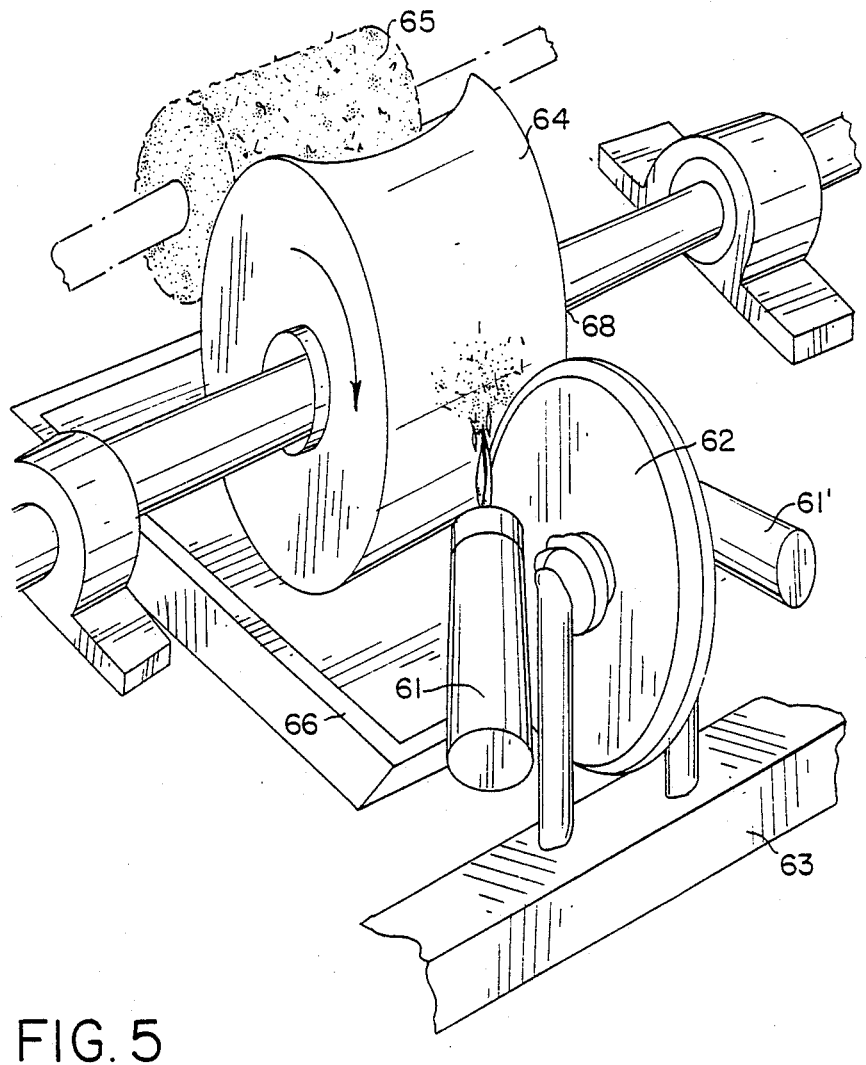
FIG. 5 shows a perspective view of a suitable apparatus for an alternative embodiment of a process according to this invention.

An often satisfactory alternative embodiment of the process involves shortening the time and distance between the melting, droplet formation, and propulsion steps of the process by supplying thin sheets of the solid MPSC to the exhaust jet from a plasma torch. The heat content of a plasma jet serves to melt the composition rapidly, and the momentum of the as in the arc is partially transferred to the melted MPSC, thereby atomizing it and causing it to move toward the chilling surface, on which the remainder of the process proceeds as with the embodiment that delivers already liquid MPSC into a flow of rapidly moving gas. A particularly preferred version of this embodiment is depicted in FIG. 5. A disc of solid MPSC 62 is placed in a holder 63 which provides conventional means not shown for rotating the disc and moving it with respect to the plasma torches 61 and 61'. These plasma torches, preferably nontransfered arc torches as described in U.S. Pat. Nos. 4,570,048 or 4,656,330, are arranged symmetrically on each side of the disc in a position that causes the edge of the disc to melt and the melted MPSC almost simultaneously with melting to be atomized and propelled toward the chilling surface 64. This surface is preferably a metal surface of rotation and is turned during operation of the process as described above. Any MPSC material that adheres long enough to the chilling surface 64 is removed by the cleaning means 65, which may be a wire brush, for example, and falls into the collector 66, along with any solidified MPSC material that spontaneously detaches itself from the chilling surface. The discs 62 may readily be formed by supplying liquid MPSC to a shallow mold of the proper shape.

The operation of the invention may be further understood from the following, non-limiting, working examples.

EXAMPLE 1

For this example, apparatus generally as depicted in FIGS. 1-4 was used. The MPSC material was prepared in the following manner: Type A 10 alumina obtainable from the Aluminum Company of America, natural baddelyite that had been subjected to conventional magnetic separation to reduce its iron content, and 99.9% pure commercial yttria available from Molycorp, Inc. were melted together in a conventional carbon arc furnace at 110 volts and 220 kilowatts. The molten material was air blown for fairly rapid solidification in the manner described in U.S. Pat. 4,565,792 and was collected as small, sometimes hollow, generally spherical particles, which were determined to have the following chemical analysis, with all percentages by weight: $Na_2O$, 0.01%; $MgO$, 0.02%; $SiO_2$, 0.15%; $CaO$, 0.07%; $TiO_2$, 0.22%; $Fe_2O_3$, 0.10%; $ZrO_2$, 30.82%; $Y_2O_3$, 1.48%; $Al_2O_3$, balance.

About 1.5 kg of this feed material was placed in the hearth 3 shown in FIG. 1. This hearth, except for a graphite pour spout insert 6 in its front wall, is made of a commercial copper alloy and is hollow walled, with conventional provisions not shown for water to circulate through the walls when needed during use. The hearth is supported on its front end by a bearing mounted support rod 8 and on its rear end by a screw 9.

The propelling gas reservoir 7 and orifice plate 19 are shown on a larger scale in FIGS. 3 and 4. As shown in FIG. 3, the orifice plate is attached to the reservoir with screws 23, allowing for easy change to orifice plates with different sizes of exit holes, and/ or with different patterns of holes, of which four are illustrated in FIG. 4. For this example, the pattern of FIG. 4C was used; the exit holes had a diameter of 1.0 mm, and the distance between centers of adjacent holes was about 1.5 mm. The gas exiting from the exit holes had a velocity of about 360 meters per second.

Chilling surface 10, as embodied during the process of this example, was a smoothly polished cylinder of commercial oxygen-free copper, with a thermal conductivity of about 3.8 joules per square centimeter of area per centimeter of thickness per degree Celsius per second. The chilling surface had a diameter of 25.4 cm and was the edge of a solid disc with a mass of about 5 kg per cm of width.

The chilling surface was supported on shaft 12 mounted in conventional bearings 11 and 11' at its ends, and the surface was caused to rotate during use via belt drive 13, which was itself driven by conventional motive means not shown. Flats and other solid MPSC bodies that formed during the operation fell off the chilling surface and were collected in collector 15, which was about half filled with water during operation of the process, in order to further cool the particles that are collected.

To begin the process according to this invention, a non-transferred arc was first established in the plasma torch 1, before it was placed in contact with the MPSC material in the hearth 3. The particular torch used for this example had a flow of about 1.1 cubic meter per hour of argon through a nozzle diameter of about 11 mm. Then, with the torch directed either toward the back end of the pouring spout 6 or toward another piece of graphite placed temporarily in the hearth, a transferred arc was established from the torch, with the path of the arc from the cathode in the plasma torch through the melted MPSC into the metal wall of the hearth 3 as the counter electrode. The transferred arc was then operated at from 300-600 amps and was moved over the MPSC surface by using torch support 2 and conventional motive means not shown, until most of the MPSC formed a molten pool 5. A small amount of the MPSC feed material remained unmelted in the rear of the hearth as a reservoir 4.

When at least three-fourths of the MPSC feed material was in molten pool 5, a flow of nitrogen at a rate of 8 liters per second was commenced through inlet 18 into propelling gas reservoir 7, the only outlet of which was a plurality of gas exit holes 20 in orifice plate 19, which was attached to reservoir 7 during use. This caused a rapid flow of turbulent propelling gas to flow from the exit holes 20 toward the chilling surface 10. Rotation of the chilling surface at about 5000 rpm, corresponding to about 66 meters/sec on the outer edge of the surface, was also begun. A current of about 700 amps from the plasma arc was used in the last few minutes before the pouring began, in order to give the pool of molten MPSC enough superheat to remain liquid through the early part of the processing.

In order to commence actual solidification according to the process of this invention, the hearth 3 was next caused to tip forward by raising supporting screw 9. When the hearth was sufficiently elevated, a stream 22 of melted MPSC began to flow as shown in FIG. 2 through the channel in graphite pour spout 6 in the front wall of the hearth 3. The temperature of this stream, as measured by an optical pyrometer focused on the stream, was about 2050° C., which is about 200° C. above the melting point of the MPSC. This stream was atomized by the turbulent propelling gas into droplets 21, which were impelled toward the chilling surface at a velocity between about 10 and 30 meters per second. When the flow began to diminish in volume, the support screw was raised further, until eventually almost all of the molten pool of MPSC had fallen into the stream of propelling gas. During the pouring process, the point of contact between the arc and the molten pool was kept from 5-10 cm behind the pour spout in order to keep high the temperature of the liquid entering the spout.

The liquid MPSC was fed into the flow of propelling gas at a rate of about 48 kg/hour, so that the entire example required less than one minute of operation once pouring had begun.

Figure 6:
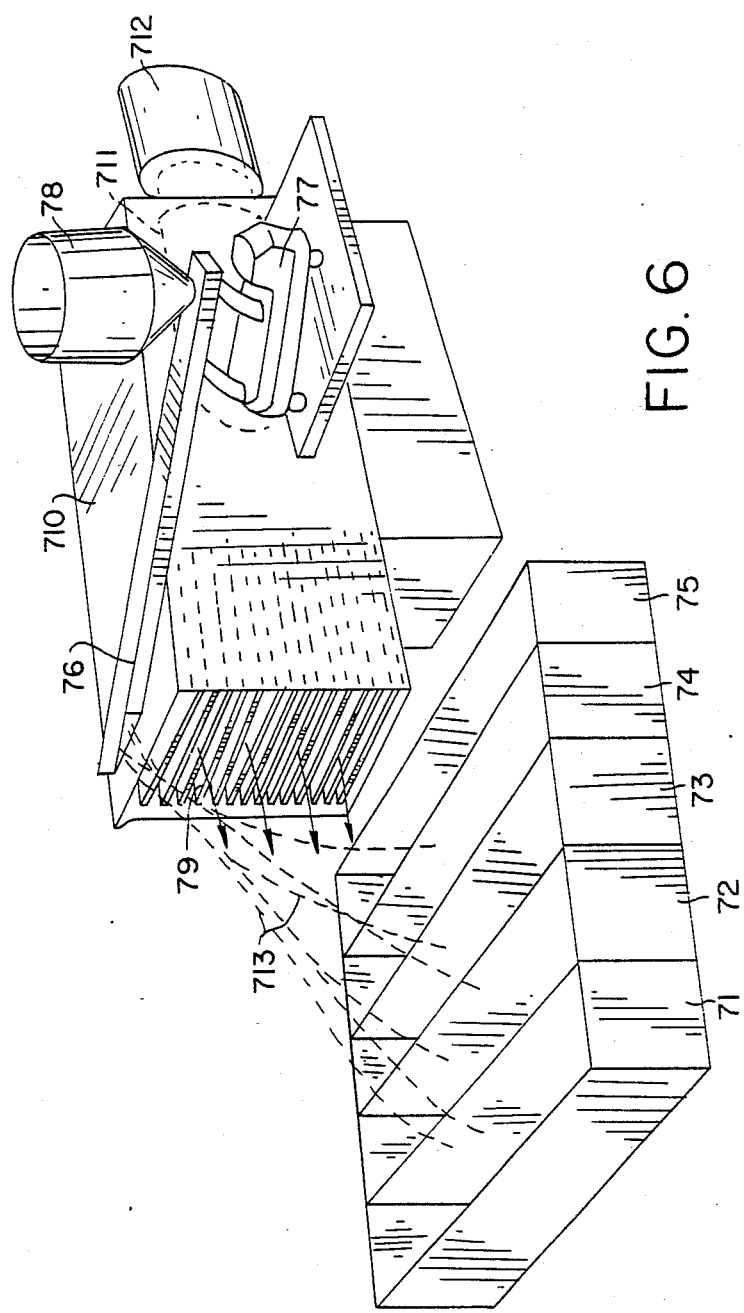
FIG. 6 is a perspective view of a separations device useful in conjunction with the processes of this invention.

The collected solidified MPSC from this process was dried by heating at about 90° C. for about four hours and then separated by operation of an apparatus as shown in FIG. 6 into flakes and other types of particles. The flakes, which comprised about half the total input of MPSC, were translucent to transparent, lightly colored, with a thickness of about 25 to 40 microns and an area of about 2-20 square millimeters, and were coherent, although quite fragile.

The flakes were subjected to X-ray diffraction (XRD), which showed no peaks corresponding to the known alumina peaks and only a broad and ill-defined peak in the region expected for zirconia. It was therefore concluded that all the alumina and most of the zirconia in the sample were amorphous in this product.

Some of the flakes were ground in a wet vibratory mill (Sweco mill) sufficiently to pass through a 200 mesh screen. The particle size after grinding was measured as 90% less than 1.2 microns, using a Coulter Counter. The slurry formed by wet milling was dried and then calcined at 500 C. for about thirty minutes, to remove any chemically bound water that had been incorporated into the material during wet milling. The calcined powder was isostatically cold compacted at about 275 megapascals (MPa) pressure to yield a good quality green body, which was further heated, without any externally imposed pressure, for two hours at 1600 C. to produce a body with a density of more than 99% of theoretical. This body had a measured modulus of rupture of over 690 MPa and a measured fracture toughness of 7.2 MPa m$^{0.5}$ at room temperature, both excellent values for this composition. The fracture toughness, in particular, was higher than would have been achieved from the same starting feed to the process as described herein, if it had merely been wet milled directly and then further densified as described above.

EXAMPLE 2

The process for this Example is performed in the same way as for Example 1, except that a different chilling surface and some additional parts of the apparatus shown in FIG. 1 are used and the process is well suited to continuous operation.

The chilling surface for this Example is a surface of rotation formed of AMPCOLOY 940, an alloy obtainable from Ampco Metals Co., Milwaukee, Wisconsin, U.S.A. The composition of this alloy is, in weight percentages, about 96.5% copper, 2.5% nickel, 0.6% silicon, and 0.4% chromium. Its thermal conductivity is about 2.2 joules per square centimeter of area per centimeter of thickness per degree Celsius per second. This surface has a diameter of 25 cm at its outer edge, but the chilling surface is smoothly dished, so that the diameter at the center of the chilling surface is about 22 cm. The chilling surface is the edge of a hollow drum like body, with walls about 19 mm thick, formed of the alloy specified above, and the interior can be filled with cooling fluid, supplied through inlet 14, during operation when needed.

Air dam 16 fits within about 3 mm of the chilling surface as it passes during rotation, helping to divert the flow of gas that otherwise passes around the chilling surface and tends to push the liquid MPSC stream back against the pour spout. Brush 17 contacts the chilling surface to facilitate detachment of any adherent MPSC flats formed on the chilling surface during use. With these additions to the apparatus, additional amounts of solid MPSC can be added to the hearth at the same mass rate as liquid MPSC is delivered from the pour spout, so that continuous operation of the process is possible, with resulting product very similar to that of Example 1.

It should be noted that the apparatus used in this example and described above can readily be enclosed in a container, so as to make it possible to maintain some atmosphere other than the natural ambient one during processing. For example, a reducing atmosphere could be maintained during the production of zirconia-alumina material to be made into abrasive grits, and superior performance as an abrasive should be achieved in this way.

EXAMPLE 3

The process for this Example is performed in the same way as described above for Example 1, except that the chilling surface is slightly roughened before use by treating it with a #72805 wire brush (sold by the Mill-Rose Company, Mentor, Ohio). The brush was rotated at a speed of about 1500 rmp while held against the surface with a force of about 10-15 lbs. The surface finish is maintained approximately constant during the run by choosing the proper pressure and type of brush 17 for the apparatus. A higher yield of flakes is obtained than from Example 1, but the characteristics of the flakes are essentially the same.

EXAMPLE 4

The process for this Example was performed in the same way as for Example 2, except that the chilling surface was conditioned by exposing it to the effluent from a Model NTLN-150 plasma torch operated with nitrogen gas for a sufficient time, about four minutes, to cause the formation of a film, believed to be a metal oxide or similar conversion coating, with substantially less thermal conductivity than the metal itself, over the surface, and that the composition of the MPSC was 60 weight percent natural bauxite, sold by the Australian company Comalco, and the balance a product made by melting together natural zircon sand and bauxite, treating with carbon to reduce the silicon content, and air blowing to give a final product in the form of beads with about 5% silica and 10% alumina by weight with the balance zirconia, its natural hafnia content, and minor impurities, principally titania. Operation of the process produced a yield primarily of fine spherical particles rather than flakes.

EXAMPLE 5

This Example process was performed as in Example 4, except that the chilling surface was the same as in Example 2. Over half the product was in the form of flats, in contrast to Example 4.

EXAMPLE 6

The process for this Example was generally the same as for Example 1, except that the MPSC was a mixture of about 38 weight % zirconia (including its natural fraction of hafnia) with the balance alumina, with up to about 2% naturally occuring impurities such as titania. The fraction of total liquid MPSC converted into flats during the experiment was about one half.

EXAMPLE 7

The process for this Example was the same as for Example 6, except that the MPSC was only about 25 weight % zirconia.

EXAMPLE 8

The process for this Example was the same as for Example 6, except that the MPSC was a mixture of about 55 weight % Comalco bauxite, with the balance the same type of mixture of zirconia-hafnia, alumina, and silica as described in Example 4.

EXAMPLE 9

The process for this Example was the same as for Example 8, except that the chilling surface used was that described in Example 2.

EXAMPLE 10

The process for this Example was the same as for Example 7, except that (i) the MPSC was about 75 weight % Comalco bauxite, with the balance a mixture containing about 1 weight % silica and the balance zirconia-hafnia with up to about 2% naturally occurring impurities, formed by the same process as described generally in Example 4, but without addition of alumina; and (ii) the yield of flats was only about 30% of the liquid MPSC processed.

What is claimed is:

1. A process for rapid solidification of a melted ceramic multi-phase solidifying composition (MPSC), comprising steps of:
  (a) providing a solid moving chilling surface maintained at a temperature sufficiently low to cause solidification of any liquid MPSC in direct contact with said chilling surface; wherein said chilling surface is in the form of a surface of rotation having a heat conductivity of less than 2 joules per second per square centimeter of area per centimeter of thickness per degree Celsius,
  (b) providing a gas outlet comprising a reservoir having in part of its defining wall an exit zone at least five times wider than its own local height;
  (c) supplying to said reservoir a sufficiently rapid flow of a propelling gas to maintain a continuous flow of said propelling gas through said exit zone at a propelling velocity of at least 200 meters per second as measured along the direction line providing the shortest distance between any part of said exit zone and said moving chilling surfaces;
  (d) introducing into the flow of propelling gas between said exit zone and said chilling surface a quantity of liquid MPSC, having a width no more than four-fifths of the width of said exit zone, that will be atomized to a plurality of fine liquid MPSC droplets by the flow of propelling gas between said exit zone and said chilling surface;
  (e) conveying said fine liquid MPSC droplets in said flow of propelling gas at a velocity that causes them to impinge, while still at least partially liquid, against said chilling surface, and after at least partial solidification thereon, to be detached from said chilling surface as small discrete bodies, and
  (f) collecting the small discrete bodies.

2. A process for changing the microstructure of a ceramic multi-phase solidifying composition (MPSC), said process comprising the steps of:
  (a) providing a moving chilling surface maintained at a temperature sufficiently low to cause solidification of any liquid MPSC in direct contact with said chilling surface, wherein said chilling surface is in the form of a surface of rotation having a heat conductivity of less than 2 joules per second per square centimeter of area per centimeter of thickness per degree Celsius,
  (b) contacting a coherent body of solid MPSC, said coherent body having an extent of at least two millimeters in at least two orthogonal dimensions, with at least one plasma jet having (i) sufficient heat content to cause partial melting of said coherent body in the vicinity of contact between said plasma jet and said coherent body and (ii) sufficient momentum in the gases of the jet to cause any liquid MPSC that forms to be propelled toward said chilling surface with sufficient velocity that it is converted into solidified flats having a thickness, measured in a direction perpendicular to their area of contact with said chilling surface, that is less than one-half of the square root of their area of contact with said chilling surface; and
  (c) separating said flats from said chilling surface;
  (d) separating the flats from other shapes of material in the mixture, including the steps of feeding the mixture on to one side of a zone of flowing gas moving in a direction substantially orthogonal to the direction of feeding and collecting separately the parts of the mixture conveyed farthest and by the flowing gas in the direction of its flow.

* * * * *